US012665142B2

(12) United States Patent
  Tannhäuser

(10) Patent No.:    US 12,665,142 B2
(45) Date of Patent:         Jun. 23, 2026

(54) CIRCUIT BREAKER DEVICE FOR PROTECTING AN ELECTRICAL LOW-VOLTAGE CIRCUIT

(71) Applicant: Siemens Aktiengesellschaft, Munich (DE)

(72) Inventor: Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 161 days.

(21) Appl. No.: 18/696,458

(22) PCT Filed: Aug. 31, 2022

(86) PCT No.: PCT/EP2022/074196
  § 371 (c)(1),
  (2) Date: Mar. 28, 2024

(87) PCT Pub. No.: WO2023/052022
  PCT Pub. Date: Apr. 6, 2023

(65) Prior Publication Data
  US 2024/0395480 A1     Nov. 28, 2024

(30) Foreign Application Priority Data

Sep. 28, 2021    (DE) ..................... 10 2021 210 812.1
  Sep. 28, 2021    (DE) ..................... 10 2021 210 824.5

(51) Int. Cl.
  *H01H 9/54*          (2006.01)
  *H02H 3/02*          (2006.01)
      (Continued)
(52) U.S. Cl.
  CPC ............ *H01H 9/548* (2013.01); *H01H 9/547* (2013.01); *H02H 3/023* (2013.01); *H02H 3/066* (2013.01); *H02H 3/08* (2013.01)

(58) Field of Classification Search
  CPC ........ H01H 9/548; H01H 9/547; H02H 3/023; H02H 3/066; H02H 3/08; H02H 3/021; H02H 3/04
  See application file for complete search history.

(56) References Cited

U.S. PATENT DOCUMENTS 11,538,642 B2    12/2022  Hussmann
  11,979,015 B2     5/2024  Erven
            (Continued)

FOREIGN PATENT DOCUMENTS

DE       102018213354 A1    2/2020
  DE       102019212661 A1    2/2021
  DE       102019213604 A1    3/2021

*Primary Examiner* — Sreeya Sreevatsa
(74) *Attorney, Agent, or Firm* — Laurence A. Greenberg; Werner H. Stemer; Ralph E. Locher

(57)                 ABSTRACT

A circuit breaker protecting an electric low-voltage circuit includes grid-side and load-side connections for low-voltage circuit conductors, a mechanical isolating contact unit having a closed contact state for current flow or an open contact state for DC isolation preventing current flow in the low-voltage circuit. An electronic interruption unit series-connected to the isolating contact unit has a high-ohmic state of switching elements preventing current flow or a low-ohmic state allowing current flow in the low-voltage circuit. The current level of the low-voltage circuit is ascertained, and upon exceeding current limit values or current/time limit values, current flow in the low-voltage circuit is prevented. After preventing current flow by a high-ohmic state of the switching elements and closed state of the contacts, at least one electric parameter at least at one load-side connection is checked.

16 Claims, 4 Drawing Sheets

(51) Int. Cl.
    _H02H 3/06_        (2006.01)
    _H02H 3/08_        (2006.01)

(56)                References Cited

U.S. PATENT DOCUMENTS

| | | | |
|---|---|---|---|
| 2017/0004948 A1 | 1/2017 | Leyh | |
| 2017/0256934 A1 | 9/2017 | Kennedy et al. | |
| 2020/0366078 A1* | 11/2020 | Telefus | H02H 3/08 |
| 2021/0066013 A1* | 3/2021 | Kumar | H01H 71/123 |
| 2021/0126447 A1* | 4/2021 | Miller | H01H 71/58 |
| 2021/0226437 A1* | 7/2021 | Lichauer | H02H 3/025 |

* cited by examiner

CIRCUIT BREAKER DEVICE FOR PROTECTING AN ELECTRICAL LOW-VOLTAGE CIRCUIT

FIELD AND BACKGROUND OF THE INVENTION

The invention relates to the technical field of a circuit breaker device for a low-voltage circuit having an electronic interruption unit and to a method for a circuit breaker device for a low-voltage circuit having an electronic interruption unit.

Low voltage is understood to mean voltages of up to 1000 volts AC or up to 1500 volts DC. Low voltage is understood in particular to mean voltages that are greater than extra-low voltage, with values of 50 volts AC or 120 volts DC.

A low-voltage circuit or grid or installation is understood to mean circuits with nominal currents or rated currents of up to 125 amperes, more specifically up to 63 amperes. A low-voltage circuit is understood to mean in particular circuits with nominal currents or rated currents of up to 50 amperes, 40 amperes, 32 amperes, 25 amperes, 16 amperes or 10 amperes. Said current values are understood to mean in particular nominal, rated or/and shutdown currents, that is to say the maximum current that is normally carried through the circuit or in the case of which the electrical circuit is usually interrupted, for example by a protection device, such as a circuit breaker device, miniature circuit breaker or power circuit breaker. The nominal currents may be gradated further, from 0.5 A through 1 A, 2 A, 3 A, 4 A, 5 A, 6 A, 7 A, 8 A, 9 A, 10 A, etc. up to 16 A.

Miniature circuit breakers are overcurrent protection devices that have long been known and that are used in low-voltage circuits in electrical installation engineering. They protect lines against damage caused by heating due to excessively high current and/or a short circuit. A miniature circuit breaker may automatically shut down the circuit in the event of an overload and/or short circuit. A miniature circuit breaker is not a fuse element that resets automatically.

In contrast to miniature circuit breakers, power circuit breakers are intended for currents greater than 125 A, in some cases also starting from 63 amperes. Miniature circuit breakers therefore have a simpler and more delicate design. Miniature circuit breakers usually have a fastening option for fastening to a so-called top-hat rail (carrier rail, DIN rail, TH35).

According to the prior art, miniature circuit breakers have an electromechanical design. In a housing, they have a mechanical switching contact or operating current tripping device for interrupting (tripping) the electric current. A bimetal protection element or bimetal element is usually used for tripping (interruption) in the event of a sustained overcurrent (overcurrent protection), respectively in the event of a thermal overload (overload protection). An electromagnetic tripping device with a coil is used for brief tripping in the event of an overcurrent limit value being exceeded or in the event of a short circuit (short circuit protection). One or more arc extinguishing chambers or arc extinguishing devices are provided. Connection elements for conductors of the electrical circuit that is to be protected are also provided.

Circuit breaker devices having an electronic interruption unit are relatively recent developments. They have a semiconductor-based electronic interruption unit. In other words, the electric flow of current in the low-voltage circuit is guided via semiconductor components or semiconductor switches that are able to interrupt the flow of electric current or are able to be switched to the on state. Circuit breaker devices having an electronic interruption unit often also have a mechanical isolating contact system, in particular with isolator properties in accordance with the applicable standards for low-voltage circuits, wherein the contacts of the mechanical isolating contact system are connected in series with the electronic interruption unit, that is to say the current of the low-voltage circuit that is to be protected is guided both through the mechanical isolating contact system and through the electronic interruption unit.

The present invention relates in particular to low-voltage AC circuits having an AC voltage, usually having a time-dependent sinusoidal AC voltage of the frequency f. The temporal dependence of the instantaneous voltage value u(t) of the AC voltage is described by the equation:

$$u(t) = U * \sin(2\pi * f * t),$$

where:

u(t)=instantaneous voltage value at the time t

U=amplitude of the voltage

A harmonic AC voltage can be represented by the rotation of a phasor, the length of which corresponds to the amplitude (U) of the voltage. The instantaneous deflection is in this case the projection of the phasor onto a coordinate system. An oscillation period corresponds to a full revolution of the phasor and its full angle is 2Π (2pi) or 360°. The angular frequency is the rate of change of the phase angle of this rotating phasor. The angular frequency of a harmonic oscillation is always 2Π times its frequency, that is to say:

ω=2Π*f=2Π/T=angular frequency of the AC voltage (T=period duration of the oscillation)

It is often preferred to give the angular frequency (o) rather than the frequency (f), since many formulae in oscillation theory can be represented more compactly using the angular frequency due to the occurrence of trigonometric functions, the period of which is by definition 2Π:

$$u(t) = U * \sin(\omega t)$$

In the case of angular frequencies that are not constant over time, the term instantaneous angular frequency is also used.

In the case of a sinusoidal AC voltage, in particular an AC voltage that is constant over time, the time-dependent value formed from the angular velocity ω and the time t corresponds to the time-dependent angle φ(t) which is also referred to as the phase angle φ(t). That is to say, the phase angle φ(t) periodically passes through the range 0 . . . 2Π or 0° . . . 360°. That is to say, the phase angle periodically assumes a value of between 0 and 2n or 0° and 360° (φ=n*(0 . . . 2Π) or φ=n*(0° . . . 360°) on account of periodicity; in abbreviated form: φ=0 . . . 2Π or φ=0° . . . 360°).

The instantaneous voltage value u(t) is therefore used to mean the instantaneous value of the voltage at the time t, that is to say, in the case of a sinusoidal (periodic) AC voltage, the value of the voltage at the phase angle φ (φ=0 . . . 2Π or φ=0° . . . 360°, of the respective period).

SUMMARY OF THE INVENTION

The object of the present invention is to improve a circuit breaker device of the type mentioned at the outset, in particular to improve the safety of such a circuit breaker device or alternatively the supply reliability of a low-voltage circuit or to provide a novel concept for such a circuit breaker device, in particular to improve the safety of the electrical line that is connected on the load side.

This object is achieved by means of a circuit breaker device as described below and by means of a method as as described below.

According to the invention, provision is made for a circuit breaker device for protecting an electrical low-voltage circuit, in particular a low-voltage AC circuit, comprising:

a housing having grid-side and load-side connections for conductors of the low-voltage circuit, a current sensor unit for ascertaining the level of the current of the low-voltage circuit, a mechanical isolating contact unit which has a closed state of the contacts for allowing a flow of current in the low-voltage circuit or an open state of the contacts for a DC isolation in the low-voltage circuit which prevents a flow of current, the mechanical isolating contact unit is able to be switched and able to be operated in particular using a mechanical handle, with the result that opening of contacts in order to prevent a flow of current or closing of the contacts for allowing a flow of current in the low-voltage circuit is able to be switched (using the handle), so that (in particular) a DC isolation in the low-voltage circuit is able to be switched;

in the case of a mechanical isolating contact unit, opening of contacts is also referred to as disconnection, and closing of contacts is also referred to as connection;

an electronic interruption unit which is connected in series with the mechanical isolating contact unit on the circuit side and which, as a result of semiconductor-based switching elements, has a high-impedance (in particular non-conductive) state of the switching elements in order to prevent a flow of current and a low-impedance state of the switching elements for allowing the flow of current in the low-voltage circuit;

in the case of an electronic interruption unit, a high-impedance (in particular non-conductive) state of the switching elements (in order to prevent a flow of current) is also referred to as a switched-off state (process: switching off) and a low-impedance (conductive) state of the switching elements (for allowing the flow of current) is referred to as a switched-on state (process: switching on);

a control unit which is connected to the current sensor unit, the mechanical isolating contact unit and the electronic interruption unit, wherein a process for preventing a flow of current in the low-voltage circuit is initiated if current limit values or current/time limit values are exceeded (that is to say when a current limit value is exceeded for a particular time period), in particular in order to prevent a short circuit.

According to the invention, the circuit breaker device is configured in such a way that, after a flow of current has been prevented by way of a high-impedance state of the switching elements of the electronic interruption unit and closed state of the contacts, at least one electrical parameter at at least one load-side connection is checked.

This has the particular advantage that, after an event which prevents a flow of current, the circuit breaker device carries out a further test, advantageously at the load-side connections which cause the event which prevents a flow of current, advantageously by checking at least one electrical parameter. It is thus possible to continue to monitor the state at the load-side connections and advantageously for further action to take place if the state changes, for example in accordance with the advantageous configurations of the invention.

On the other hand, a completely novel operating concept of a circuit breaker device is introduced, in which, in contrast to previous miniature circuit breakers, for example, testing is also carried out after an event which prevents a flow of current.

Advantageous configurations of the invention are specified in the dependent claims and in the exemplary embodiment.

According to the invention, the circuit breaker device therefore contains two switching units: a mechanical isolating contact unit (switching unit) and an electronic interruption unit (switching unit), wherein the mechanical isolating contact unit comprises (carries out/undertakes) the function for (electrical) connection and disconnection, and the electronic interruption unit comprises (carries out/undertakes) the function for respectively switching the current or the voltage on and off.

In particular, the mechanical isolating contact unit is only able to be operated using the mechanical handle. The switching on and off by means of the electronic interruption unit is not able to be operated (directly) on the device.

In one advantageous configuration of the invention, the at least one electrical parameter has a target range which in particular is dependent on the circuit breaker device.

The checking is carried out until the electrical parameter is within the target range.

The electronic interruption unit changes to the low-impedance state if the electrical parameter is within the target range.

This has the particular advantage that a completely novel operating concept of a circuit breaker device is introduced. In the case of miniature circuit breakers according to the prior art, after an event which prevents a flow of current, a restart or power supply of the load side, self-initiated by the circuit breaker device, is not readily provided. If necessary, there are auxiliary devices, such as what are known as remote-controlled mechanisms with ARD (automatic reclosed device) or motor drives which additionally have to be mounted externally, are costly and require additional space. However, these auxiliary devices have a restart time in the range of minutes, at the fastest in a range of several seconds. In the case of the event which prevents a flow of current ceasing to exist or electrical parameters at the load-side connection or the load-side connections being within the target range, the configuration of the novel circuit breaker device according to the invention is advantageously used to re-establish a power supply by way of the low-impedance state (automatically or in a predefined manner); this is carried out using the electronic interruption unit in the millisecond range or microsecond range.

In one advantageous configuration of the invention, the target range is characterized by a target value. In particular, the checking is carried out until the electrical parameter is greater than a minimum target value.

This has the particular advantage that a particularly simple target range is present, a check is only carried out for exceedance of the target value. An (economically) simple implementation of the invention is therefore possible.

In one advantageous configuration of the invention, if the electrical parameter is within the target range, the electronic interruption unit changes to the low-impedance state only when the electrical parameter is within the target range for a first time range (time range in which there is no fault). In particular, the first time range can be set, for example by way of an input unit (communication unit).

The first time range may be for example 10 ms to 100 ms; with respect to shorter times, the first time range may also be 1 ms to 100 ms. With respect to longer times, the first time range may be for example 10 ms to 10 s, more specifically 10 ms to 1 s or 10 ms to 200 ms. Any intermediate value is possible and disclosed.

This has the particular advantage that a higher degree of supply reliability for the power supply is provided, since the power supply is not interrupted in the case of temporary faults.

In one advantageous configuration of the invention, the circuit breaker device has an input unit. If the electrical parameter is within the target range, the electronic interruption unit changes to the low-impedance state only when there is confirmation by means of the input unit (communication unit) or after there is confirmation (by means of the input unit (communication unit)).

This has the particular advantage that a higher degree of safety is provided in the low-voltage circuit, since an operating person must first provide confirmation in the case of a fault.

In one advantageous configuration of the invention, at least one electrical parameter is checked within a first time period Pre-Trip 1 (time period of the first checking time) after the current limit value or current/time limit value has been exceeded. In particular, the first time period can be set, for example by way of an input unit (communication unit). The first time period may be in particular less than 200 ms, 100 ms, 50 ms, 30 ms, 20 ms or 10 ms. Intermediate values are also possible.

This has the particular advantage that a check is carried out in particular before a temporal trip behavior determined by a standard (the circuit breaker device must interrupt the circuit after 100 ms [according to DIN EN 60898-1 a check is carried out determine whether tripping occurs within 100 ms (in the event of a short-circuit)]) in order to identify faults or fault states in accordance with standards and to supply power to the circuit again where necessary (in accordance with standards). Said first time period can advantageously be configured or said time period is advantageously dependent on the tripping event/fault.

In one advantageous configuration of the invention, after the first time period has passed, the contacts of the mechanical isolating contact unit are opened when at least one electrical parameter is outside of the target range thereof.

This has the particular advantage that the novel circuit breaker device has an equivalent behavior (due to electrical interruption) to previous devices, such as miniature circuit breakers, for example, in order to meet standard specifications. A check can advantageously be carried out before the electrical interruption, which is not possible using previous circuit breaker devices.

In one advantageous configuration of the invention, the electrical parameter is a current, a voltage, a resistance, a capacitance, an inductance or an impedance. In a first variant, the electrical parameter is in particular a resistance, a capacitance, an inductance or an impedance, more specifically the resistance or the impedance. In a second variant, the electrical parameter is in particular a current or a voltage.

This has the particular advantage that a specific measurement for the electrical parameter can be implemented.

In one advantageous configuration of the invention, the mechanical isolating contact unit is assigned to the load-side connections and the electronic interruption unit is assigned to the grid-side connections.

This has the particular advantage that an architecture which supports the inventive behavior of the circuit breaker device is provided, since on the one hand the circuit breaker device interrupts the flow of current when the interruption unit has a high impedance, but the contacts that are connected on the load side also ensure that at least one electrical parameter at at least one load-side connection can be checked in accordance with the invention.

In one advantageous configuration of the invention, at least one electrical parameter at at least one load-side connection is checked by way of at least one switching element, in particular two or all switching elements, of the electronic interruption unit coming to have a low impedance, in particular coming to have a low impedance for a first switched-on period.

This has the particular advantage that a simple option for checking at least one electrical parameter at at least one load-side connection is provided, since only the present electronic interruption unit needs to be switched to the low-impedance state (temporarily) in order to generate a measurement current or a measurement voltage temporarily in order to carry out the check on at least one electrical parameter, for example for the current and for the identification of the level of the resistance, capacitance, inductance or impedance.

A voltage sensor unit is also advantageously provided for this purpose, in particular for the identification of the level of the resistance, capacitance, inductance or impedance.

In one advantageous configuration of the invention, at least one electrical parameter at at least one load-side connection is checked by way of the switching elements of the electronic interruption unit coming to have a low impedance at an absolute-value instantaneous value of the voltage that is lower than a first voltage threshold value.

The first voltage threshold value is in particular lower than 50 volts or a value of (protective) extra-low voltage. The first voltage threshold value can advantageously be set.

This has the particular advantage that at least one electrical parameter at at least one load-side connection is checked at a voltage which is safe for humans, such that the safety of both the circuit breaker device and in the low-voltage circuit is ensured.

In one advantageous configuration of the invention, the switching elements come to have a high impedance again at an absolute-value instantaneous value of the voltage that is greater than the first voltage threshold value.

This in turn has the particular advantage that at least one electrical parameter at at least one load-side connection is checked at a voltage which is safe for humans, such that the safety of both the circuit breaker device and in the low-voltage circuit is ensured.

In one advantageous configuration of the invention, at least one electrical parameter at the load-side connections is checked by applying an auxiliary voltage, in particular a DC voltage, which is lower than a first voltage limit. The first voltage limit is in particular less than 50 volts or a value of (protective) extra-low voltage.

This in turn has the particular advantage that at least one electrical parameter at at least one load-side connection is checked by way of another solution at a voltage which is safe for humans, such that the safety of both the circuit breaker device and in the low-voltage circuit is ensured.

In one advantageous configuration of the invention, in particular after the first time period has passed, at least one electrical parameter at at least one load-side connection is checked at a first time interval. The first time interval may be able to be set or configured. The first time interval is in particular 1 s, 10 s, 30 s, 60 s or 1 min, 5 min, 10 min or 15 min (min=minutes). Any intermediate value is possible.

This has the particular advantage that cyclical checking is carried out over a longer period without having to constantly carry out checking functions or checking routines.

In one advantageous configuration of the invention, the mechanical isolating contact unit changes to an open state of the isolating contacts after a first time limit has passed. The first time limit may be able to be set or configured. The first time limit is for example 1 min, 5 min, 10 min, 15 min, 30 min, 1 h, 8 h, 24 h, 36 h or 48 h. Any intermediate value is possible. The first time interval is determined by the first time limit. This means that the first time interval is smaller than the first time limit.

This has the particular advantage that, after the time limit has passed, a permanent or significant defect in the low-voltage circuit can be deduced and a safe state in the low-voltage circuit is initiated by way of DC isolation.

In one advantageous configuration of the invention, a display unit for displaying information is provided on the circuit breaker device, said display unit being connected to the control unit. The display unit displays in particular states of the circuit breaker device. Furthermore, for example, the execution of the testing functions or/and the fact that there is an automatic restart when there are no faults.

The information display displays in particular the state of the switching elements of the electronic interruption unit. Furthermore, in particular the position of the contacts of the mechanical isolating contact unit can be displayed.

This has the particular advantage that a user can quickly identify the state of the circuit breaker device, in particular the state of the electronic interruption unit.

In one advantageous configuration of the invention, the checking of at least one electrical parameter at the at least one load-side connection (as an alternative or in addition at at least one grid-side connection) carries out a check of at least one, in particular a plurality or all, of the following parameters:

testing for exceedance of a first overvoltage value or/and a higher second overvoltage value or/and a higher third overvoltage value for a first duration, testing for undershooting of a load-side first or/and second resistance value or load-side first or/and second impedance value for a second duration.

Overvoltage or overvoltage value is understood in this case to mean in particular an exceedance of the applicable operating voltage. It does not mean the levels of overvoltage dips, for example at so-called bursts or surges, which may typically be 4 kV or 8 kV (in the case of a 230 volt or 400 volt grid), so-called grid overvoltages (that is to say ten times the normative voltage of the low-voltage circuit, for example).

In particular, the first overvoltage value may be a particular percentage amount higher than the normative voltage value. For example, at a normative voltage value of 230 volts, it may be 10% higher, for example, 230 V+10%.

In particular, the second overvoltage value may be a particular percentage amount higher than the normative voltage value. For example, at a normative voltage value of 230 volts, it may be 20% higher, for example, 230 V+20%.

In particular, the third overvoltage value may be a particular percentage amount higher than the normative voltage value. For example, at a normative voltage value of 230 volts, it may be 30% higher, for example, 230 V+30%, This has the particular advantage that for example a circuit breaker device is not switched on at a load with erroneous parameters. It is thus possible to identify and prevent for example a lack of protection in the case of a faulty connection of for example a 230 volt circuit breaker device to for example the two phases with a voltage of 400 volts. It is also possible to prevent potential destruction of the circuit breaker device in connection therewith. In a similar manner, (re)connection to a short circuit can be identified and prevented. An increased level of operational safety in the low-voltage circuit is thus achieved.

That is to say that testing for exceedance or undershooting of a parameter means the exceedance or undershooting with the respective duration (first, second duration). That is to say that a possible fault (overvoltage) is present only after exceedance/undershooting for the duration. The first or second duration may be for example a value from the range of 5 ms to 50 ms to 500 ms to 5 s (any intermediate value is possible and disclosed).

In one advantageous configuration of the invention, depending on the preceding implementation:

a piece of overvoltage information is output if the first overvoltage value is exceeded, the electronic interruption unit comes to have a high impedance if the second overvoltage value is exceeded, the contacts are opened (disconnected) by way of the mechanical isolating contact unit if the third overvoltage value is exceeded, a piece of impedance information is output if the load-side first resistance value or load-side first impedance value is undershot (for the second duration), or the electronic interruption unit keeps having a high impedance if the load-side second resistance value or load-side second impedance value is undershot.

This has the particular advantage that defined measures—warning—continuing to have a high impedance—DC isolation—are carried out in stages, depending on the exceedance or undershooting of particular defined parameters. Reconnecting to a fault is prevented or can advantageously be carried out again after the fault has been eliminated. An increased level of operational safety or supply reliability in the low-voltage circuit is thus achieved.

In one advantageous configuration of the invention, at least one, in particular a plurality or all, of the parameters is checked continuously. In this context, continuously means more specifically that for example checking processes are carried out in each grid period (full wave) or half wave of the electrical voltage (half cycle). As an alternative, a check can be carried out every second, third, fourth, . . . nth grid period. This takes place in particular when the contacts have not been opened. If the respective parameter(s) is (are) no longer exceeded or undershot, a low-impedance state of the switching elements is permitted.

This has the particular advantage that a differentiated behavior of the circuit breaker device is made possible. In the case of deviating parameters at the load-side connection, which do not exceed certain limit values, the circuit breaker device remains in the connected—but not activated—state until the parameters are within the target range or normal range, in particular for the time range. Reactivation is then possible. A high degree of flexibility at the same time as a high degree of safety is thus achieved.

In one advantageous configuration of the invention, when the isolating contact unit is connected and the interruption unit has a low impedance and in the case of an ascertained current which exceeds a first current limit value, in particular the first current limit value is exceeded for a first time, the electronic interruption unit has a high impedance and the mechanical isolating contact unit remains closed.

Furthermore:

in the case of an ascertained current which exceeds a second current limit value, in particular for a second time, the electronic interruption unit comes to have a high impedance and the mechanical isolating contact unit is opened.

Furthermore:

in the case of an ascertained current which exceeds a third current limit value, the electronic interruption unit comes to have a high impedance immediately or almost immediately. As an alternative, the mechanical isolating contact unit can also be opened.

This has the particular advantage that a staged shutdown concept for a circuit breaker device according to the invention is provided.

In one advantageous configuration of the invention, the circuit breaker device is configured in such a way that the contacts of the mechanical isolating contact unit can be opened, but not closed, by way of the control unit.

This has the particular advantage that an increased level of operational safety in the low-voltage circuit is achieved, in particular that it is not possible to perform electronic connection remotely.

In one advantageous configuration of the invention, the contact position of the mechanical isolating contact unit is displayed (mechanically).

This has the particular advantage that a visual check of the contact position is also possible even in the state in which there is no power. An increased level of operational safety in the low-voltage circuit is thus achieved.

In one advantageous configuration of the invention, the mechanical isolating contact unit has a trip-free release, such that, when a process for opening the contacts is initiated after a closing process of the contacts has begun, the contacts return to the open position, even if the closing process continues.

In other words, the moving contacts return to the open position and remain there if the process for opening the contacts is initiated after the closing of the contacts has begun, even if the process for closing the contacts by way of the handle continues.

This has the particular advantage that a high degree of operational safety in the low-voltage circuit is achieved. In the case of connection to a short circuit which has not been identified (is not known), the user actuates the handle of the mechanical isolating contact unit and would thus like to close the contacts. However, in the case of a short circuit, the contacts must open, which opposes the operating direction (the closing of the contacts by way of the operator). A significant fault is prevented only by (rapidly) opening the contacts opposite to the operating direction. According to the invention, when the contacts are closed by way of the handle, the electronic interruption unit still has a high impedance, and so a fault is prevented.

According to the invention, a corresponding method for a circuit breaker device for a low-voltage circuit having electronic (semiconductor-based) switching elements with the same and further advantages is claimed.

The method for a circuit breaker device for protecting an electrical low-voltage circuit, in which:

grid-side and load-side connections are provided for conductors of the low-voltage circuit, a mechanical isolating contact unit having a closed state of the contacts for allowing a flow of current in the low-voltage circuit or an open state of the contacts for a DC isolation in the low-voltage circuit which prevents a flow of current is provided, an electronic interruption unit is provided, which is connected in series with the mechanical isolating contact unit on the circuit side and which, as a result of semiconductor-based switching elements, has a high-impedance state of the switching elements in order to prevent a flow of current and a low-impedance state of the switching elements for allowing the flow of current in the low-voltage circuit, the level of the current of the low-voltage circuit is ascertained and a process for preventing a flow of current in the low-voltage circuit is initiated if current limit values or current/time limit values are exceeded, after a flow of current has been prevented by way of a high-impedance state of the switching elements of the electronic interruption unit and closed state of the contacts, at least one electrical parameter at at least one load-side connection is checked.

In advantageous configurations of the method, one or more of the specified points are provided:

the checking is carried out until the electrical parameter is within the target range and the electronic interruption unit changes to the low-impedance state when the electrical parameter is within the target range.

the checking is carried out until the electrical parameter is greater than a minimum target value, wherein the target range is characterized by a target value.

when the electrical parameter is within the target range, the electronic interruption unit changes to the low-impedance state only when the electrical arbiter is within the target range for a first-time range (beginning from 1 ms or 10 ms or 100 ms or 1 s; up to 10 ms or 100 ms or 1 s or 10 s; in particular 10 ms to 100 ms or to 200 ms, for up to 1 s, or to 10 s).

when the electrical parameter is within the target range, the electronic interruption unit changes to the low-impedance state only when there is confirmation by means of the input unit.

the checking for at least one electrical parameter is carried out within a first time period after the current limit value or current/time limit value has been exceeded. Said first time period is in particular less than 200 ms, 100 ms, 50 ms, 30 ms, 20 ms or 10 ms.

after the first time period has passed, the contacts of the mechanical isolating contact unit are opened when at least one electrical parameter is outside of the target range thereof.

at least one electrical parameter at at least one load-side connection is checked by way of at least one switching element, in particular two or all switching elements, of the electronic interruption unit coming to have a low impedance.

at least one electrical parameter at at least one load-side connection is checked by way of the switching elements of the electronic interruption unit coming to have a low impedance at an absolute-value instantaneous value of the voltage that is lower than a first voltage threshold value.

the switching elements come to have a high impedance again at an absolute-value instantaneous value of the voltage that is greater than the first voltage threshold value (in particular the first voltage threshold value is the one for (protective) extra-low voltage).

the checking for at least one electrical parameter at the load-side connections is carried out by applying an auxiliary voltage, in particular a DC voltage, which is lower than a first voltage limit.

in particular after the first time period has passed, the checking is carried out at a first time interval.

the mechanical isolating contact unit changes to an open state of the isolating contacts after a first time limit has passed.

According to the invention, a corresponding computer program product for a circuit breaker device is claimed. The computer program product comprises commands that, when the program is executed by a microcontroller, prompt same, after a flow of current has been prevented by way of a high-impedance state of the switching elements of the electronic interruption unit and closed state of the contacts, to check at least one electrical parameter at at least one load-side connection in accordance with any one of the patent claims. The microcontroller is part of the circuit breaker device, in particular the control unit.

According to the invention, a corresponding computer-readable storage medium on which the computer program product is stored is claimed.

According to the invention, a corresponding data carrier signal that transmits the computer program product is claimed.

All configurations, both in dependent form referring back to the independent patent claims, respectively, and referring back only to individual features or combinations of features of patent claims, in particular also dependent assembly claims referring back to the independent method claim, improve a circuit breaker device, in particular improve the safety of a circuit breaker device, and provide a new concept for a circuit breaker device.

The described properties, features and advantages of this invention and the manner in which they are achieved become clearer and more distinctly comprehensible in connection with the following description of the exemplary embodiments which are explained in more detail in connection with the drawing.

DETAILED DESCRIPTION OF THE INVENTION

Figure 1:
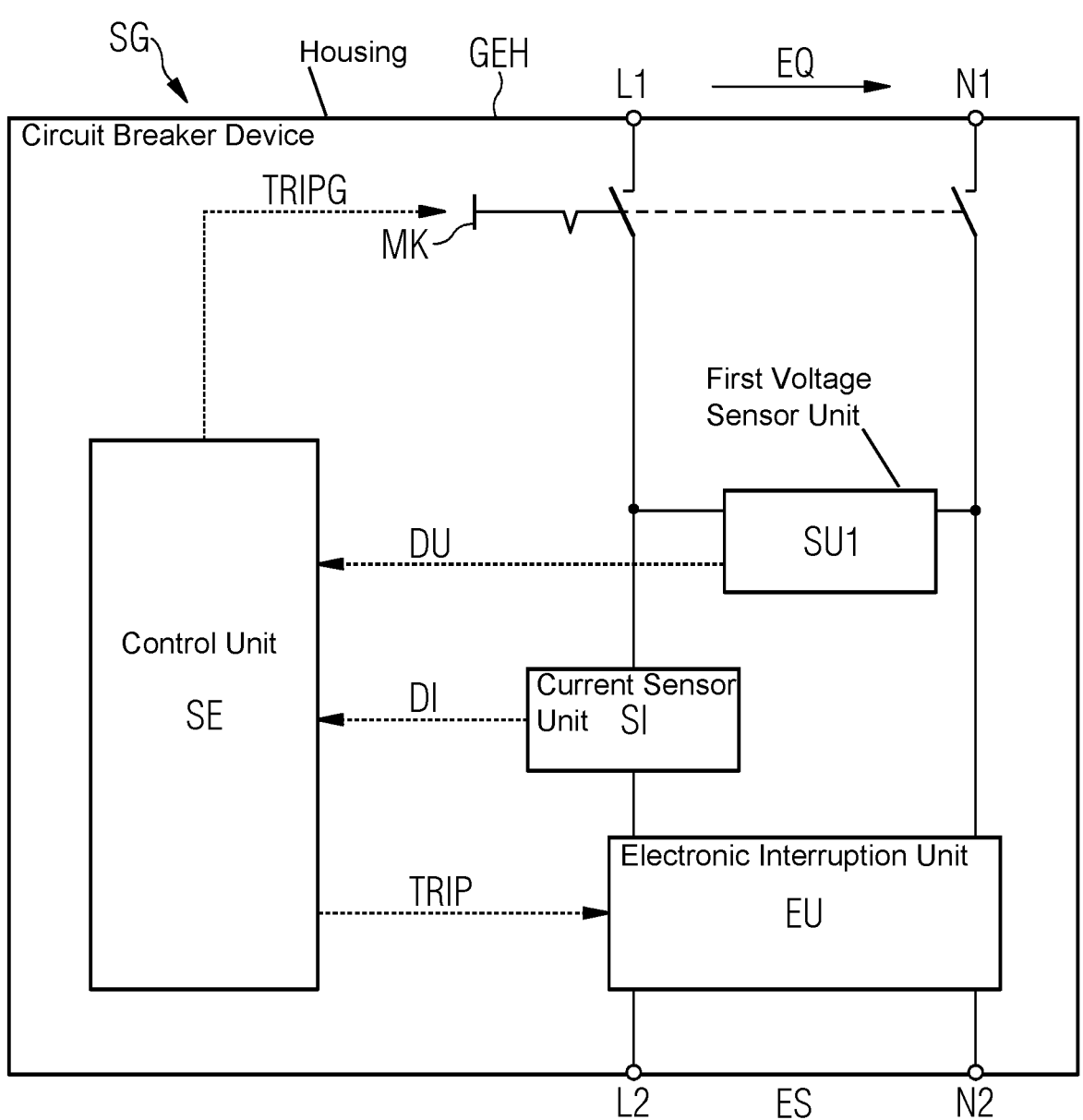
FIG. 1 shows a first illustration of a circuit breaker device.

FIG. 1 shows an illustration of a circuit breaker device SG for protecting an electrical low-voltage circuit comprising a housing GEH, comprising:

connections for conductors of the low-voltage circuit, in particular first grid-side connections L1, N1 for a grid-side, in particular power-source-side, connection EQ of the circuit breaker device SG and second load-side connections L2, N2 for a load-side, in particular energy-sink-side—in the case of passive loads, connection ES (consumer-side connection) of the circuit breaker device SG, wherein phase-conductor-side connections L1, L2 and neutral-conductor-side connections N1, N2 may be provided, in particular;

the load-side connection L2, N2 may have a passive load (consumer) or/and an active load ((further) energy source) or a load which may be both passive and active, for example in a time sequence;

a first voltage sensor unit SU1 for ascertaining the level of the voltage of the low-voltage circuit, with the result that in particular instantaneous (phase-angle-related) voltage values DU are available, a current sensor unit SI for ascertaining the level of the current of the low-voltage circuit such that in particular instantaneous (phase-angle-related) current values DI are available, a mechanical isolating contact unit MK, in particular a mechanical isolating contact unit which can be operated and switched by means of a mechanical handle, with the result that opening of contacts in order to prevent a flow of current or closing of the contacts for allowing a flow of current in the low-voltage circuit can be switched (by means of the handle) so that (in particular) DC isolation in the low-voltage circuit can be switched;

in the case of the mechanical isolating contact unit MK, opening of contacts is also referred to as disconnection and closing of contacts is referred to as connection;

an electronic interruption unit EU which is connected in series with the mechanical isolating contact unit on the circuit side and, by virtue of semiconductor-based switching elements, has a high-impedance state of the switching elements in order to avoid a flow of current and a low-impedance state of the switching elements for allowing the flow of current in the low-voltage circuit;

in the case of the electronic interruption unit EU, a high-impedance state of the switching elements (for preventing a flow of current) is also referred to as a switched-off state (process: switch off) and a low-impedance (conductive) state of the switching elements (for allowing the flow of current) is referred to as a switched-on state (process: switch on);

a control unit SE which is connected to the first voltage sensor unit SU, the current sensor unit SI, the mechanical isolating contact unit MK and the electronic interruption unit EU, wherein a process for preventing a flow of current in the low-voltage circuit is initiated if current limit values or current-time limit values are exceeded (that is to say if a current limit value is exceeded for a certain period of time), in particular in order to prevent a short-circuit current.

In the example according to FIG. 1, the grid-side connections L1, N1 are connected, on the one hand, to the mechanical isolating contact unit MK. The mechanical isolating contact unit MK is connected, on the other hand, to the electronic interruption unit EU. The electronic interruption unit EU is connected, on the other hand, to the load-side connections L2, N2.

In an alternative variant, the mechanical isolating contact unit MK is arranged between the electronic interruption unit EU and the load-side connections L2, N2.

The voltage measurement SU1 and the current measurement are assigned to the grid-side connections L1, N2 and the electronic interruption unit EU is connected to the grid-side connections L1, N1.

In general, the mechanical isolating contact unit MK is connected in series with the electronic interruption unit EU. In the alternative variant, the mechanical isolating contact unit MK is assigned to the load-side connections and the electronic interruption unit EU is assigned to the grid-side connections.

In this alternative variant, a power supply unit for supplying power is then advantageously (directly) connected to the grid-side connections, with the result that it is constantly supplied with power from the grid-side connections and the power source EQ usually provided there. The first voltage sensor unit SU1 and the current sensor unit SI are arranged between the mechanical isolating contact unit MK and the electronic interruption unit EU.

A third voltage sensor unit SU3 can be arranged between the electronic interruption unit EU and the load-side connections L2, N2 (not depicted in FIG. 1).

The circuit breaker device SG may have a power supply with a power supply unit NT (not depicted in FIG. 1). The power supply unit NT is connected, on the one hand, to the conductors of the low-voltage circuit, preferably to the conductors between the mechanical isolating contact system MK and the electronic interruption unit EU. The power supply unit NT is used, on the other hand, to supply power to the control unit SE or/and the electronic interruption unit EU and possibly the first (or/and second) voltage sensor SU or/and current sensor SI.

The circuit breaker device SG, in particular the control unit SE, may have a microcontroller (=microprocessor) on which a computer program product runs, said computer program product comprising instructions which, when the program is executed by the microcontroller, cause the latter to carry out a check (as described above and in the following text) for a circuit breaker device.

The computer program product can advantageously be stored on a computer-readable storage medium, such as a USB stick, a CD-ROM, etc., in order to enable an upgrade to an extended version, for example.

The computer program product may alternatively also be advantageously transmitted by means of a data carrier signal.

The control unit SE may:

be implemented with a digital circuit, for example with a (further) microprocessor; the (further) microprocessor may also contain an analog part;

be implemented with a digital circuit with analog circuit parts.

The circuit breaker device SG, in particular the control unit SE, is configured in such a manner that a process for preventing a flow of current in the low-voltage circuit is initiated if current limit values or current-time limit values are exceeded (that is to say when a current limit value is exceeded for a certain period of time), in particular in order to prevent a short-circuit current. This is achieved, in particular, by virtue of the electronic interruption unit EU changing from the low-impedance state to the high-impedance state. The process for preventing of a flow of current in the low-voltage circuit is initiated, for example, by means of a first interruption signal TRIP which is sent from the control unit SE to the electronic interruption unit EU, as is depicted in FIG. 1.

According to FIG. 1, the electronic interruption unit EU is depicted as a block in both conductors. This means no interruption of both conductors in a first variant. At least one conductor, in particular the active conductor or phase conductor, has semiconductor-based switching elements. The neutral conductor may be free of switching elements, that is to say may be without semiconductor-based switching elements. That is to say, the neutral conductor is connected directly, that is to say does not come to have a high impedance. That is to say, only single-pole interruption (of the phase conductor) is effected. If further active conductors/phase conductors are provided, the phase conductors have semiconductor-based switching elements in a second variant of the electronic interruption unit EU. The neutral conductor is connected directly, that is to say does not come to have a high impedance, for example for a three-phase AC circuit.

In a third variant of the electronic interruption unit EU, the neutral conductor may likewise have a semiconductor-based switching element, that is to say both conductors come to have a high impedance when the electronic interruption unit EU is interrupted.

The electronic interruption unit EU may have semiconductor components such as bipolar transistors, field-effect transistors (FET), isolated gate bipolar transistors (IGBT), metal oxide layer field-effect transistors (MOSFET) or other (self-commutated) power semiconductors. In particular, IGBTs and MOSFETs are particularly well suited to the circuit breaker device according to the invention on account of low forward resistances, high junction resistances and a good switching behavior.

In a first variant, the mechanical isolating contact unit MK can carry out single-pole interruption. That is to say, only one conductor of the two conductors, in particular the active conductor or phase conductor, is interrupted, that is to say has a mechanical contact. The neutral conductor is then free of contact, that is to say the neutral conductor is connected directly.

If further active conductors/phase conductors are provided, the phase conductors have mechanical contacts of the mechanical isolating contact system in a second variant. The neutral conductor is connected directly in this second variant, for example for a three-phase AC circuit.

In a third variant of the mechanical isolating contact system MK, the neutral conductor likewise has mechanical contacts, as is depicted in FIG. 1.

A mechanical isolating contact unit MK is used to mean, in particular, a (standards-compliant) isolating function which is implemented by the isolating contact unit MK. An isolating function is used to mean the following points:

minimum clearance in air according to the standard (minimum distance between the contacts), contact position indication of the contacts of the mechanical isolating contact system, actuation of the mechanical isolating contact system always possible (no blocking of the isolating contact system—in particular by means of the handle, trip-free release).

The minimum clearance in air between the contacts of the isolating contact system is substantially voltage-dependent. Further parameters are the pollution degree, the type of field (homogeneous, inhomogeneous) and the barometric pressure and the height above sea level.

There are corresponding rules or standards for these minimum clearances in air or creepage distances. These rules specify, for example in air for an impulse withstand voltage, the minimum clearance in air for an inhomogeneous and a homogeneous (ideal) electrical field on the basis of the pollution degree. The impulse withstand voltage is the strength when a corresponding impulse voltage is applied. The isolating contact system or circuit breaker device has an isolating function (isolator property) only when this minimum length (minimum distance) is present.

In the sense of the invention, the DIN EN 60947 or IEC 60947 series of standards, to which reference is made here, is relevant in this case to the isolator function and its properties.

The isolating contact system is advantageously characterized by a minimum clearance in air of the open isolating contacts in the OFF position (open position, open contacts) on the basis of the rated impulse withstand voltage and the pollution degree. The minimum clearance in air is, in particular, between (a minimum of) 0.01 mm and 14 mm. In particular, the minimum clearance in air is advantageously between 0.01 mm at 0.33 kV and 14 mm at 12 kV, in particular for pollution degree 1 and in particular for inhomogeneous fields.

The pollution degrees and types of field correspond to those defined in the standards. This advantageously allows a standards-compliant circuit breaker device dimensioned according to the rated impulse withstand voltage to be achieved.

The mechanical isolating contact unit MK may alternatively or additionally be controlled by way of the control unit SE in order to initiate a process for preventing a flow of current in the low-voltage circuit if current limit values or current-time limit values are exceeded. DC isolation is specifically brought about in this case, if necessary. The initiation of the process for preventing a flow of current or possible electrical interruption of the low-voltage circuit is effected, for example, by means of a second interruption signal TRIPG which is sent from the control unit SE to the mechanical isolating contact system MK, as is depicted in FIG. 1.

In one advantageous configuration, interruption of the low-voltage circuit can be initiated, in particular by means of the mechanical isolating contact unit MK, if a current level that exceeds the second current threshold value is ascertained.

The second current threshold value corresponds, for example, to the standardized current(-time) limit values, that is to say the I(-t) characteristic curves for protection devices, for example according to the IEC 60947 or IEC 60898 standard. A person skilled in the art chooses the selected current(-time) limit values according to the present use/application.

In a similar manner, a third current threshold value can be selected, for example, according to standardized current-time limit values, that is to say the I-t characteristic curves for protection devices, for example according to the IEC 60947 or IEC 60898 standard. A person skilled in the art chooses the selected current-time limit values according to the present use/application.

The circuit breaker device SG is configured for example in such a manner that the electronic interruption unit EU has a high impedance in the disconnected state, that is to say when the contacts of the mechanical isolating contact unit MK are open. If a user of the circuit breaker device SG operates the mechanical handle for a switching-on process in order to close the contacts, a testing function is carried out, in particular after the contacts have been closed (that is to say connected). If the testing function provides a positive result, the electronic interruption unit EU comes to have a low impedance, and otherwise does not.

That is to say, the electronic interruption unit EU comes to have a low impedance only when the testing function allows a low-impedance state of the switching elements.

Figure 2:
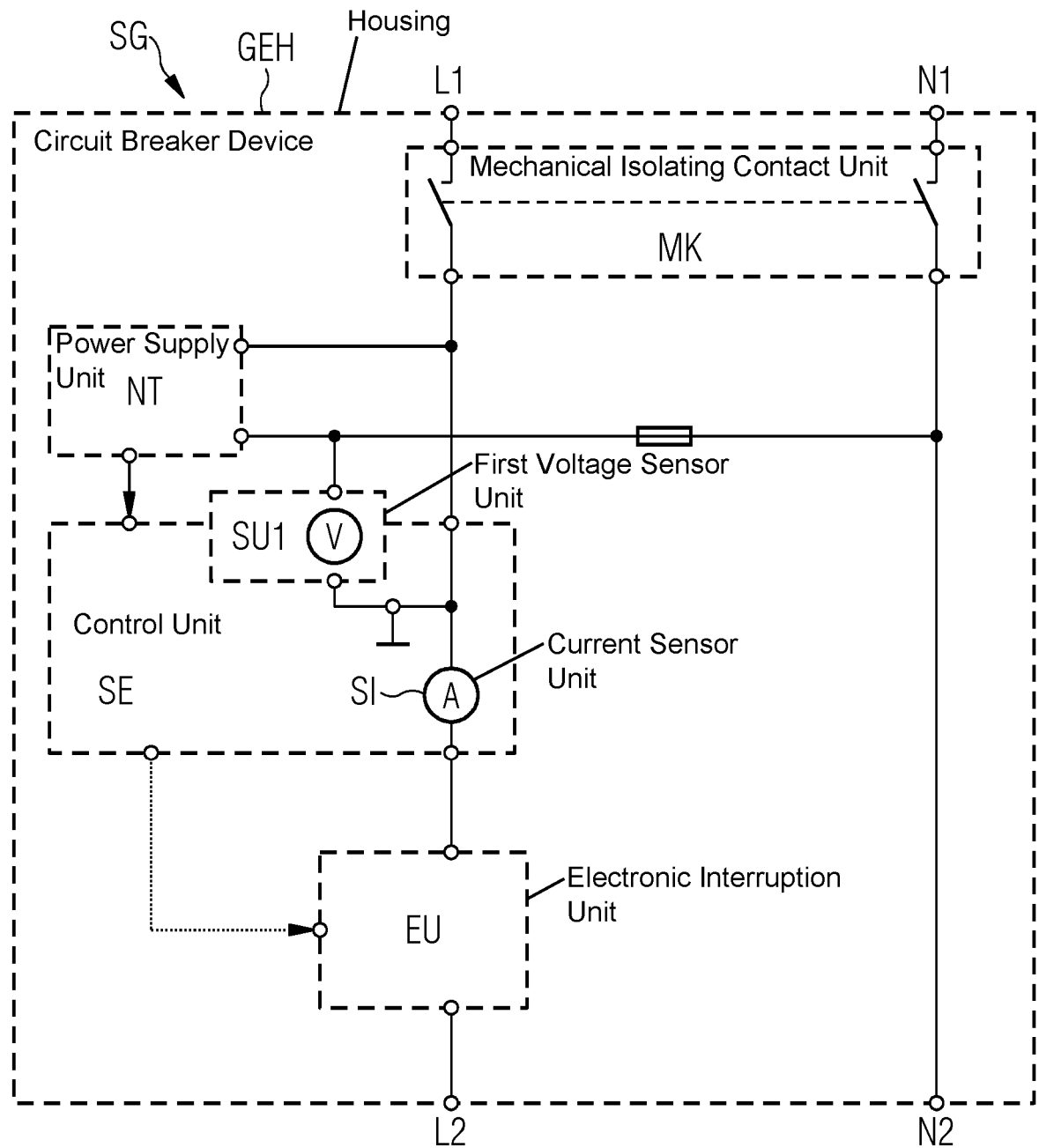
FIG. 2 shows a second illustration of a circuit breaker device.

FIG. 2 shows an illustration of a circuit breaker device SG according to FIG. 1 with the difference that:
the electronic interruption unit EU is in the form of a unit that carries out single-pole interruption, the mechanical isolating contact unit MK is in the form of a unit that carries out two-pole interruption (DC interruption), a power supply unit NT is provided and is connected between the mechanical isolating contact unit MK and the electronic interruption unit EU,
the power supply unit NT supplies the control unit SE with power (which is indicated by an arrow).

The circuit breaker device SG can be configured as a circuit breaker device SG which can be mounted on a top-hat rail and has a width of, for example, 1 HP, 1.5 HP or 2 HP with two-pole connections (L, N). In electrical installation and in switchgear cabinet construction, the width of built-in devices such as circuit breaker devices, miniature circuit breakers, fault current circuit breakers etc. is stated in horizontal pitch units, HP for short. The width of a horizontal pitch unit is ~18 mm. The installation width of the devices is intended to be between 17.5 and 18.0 mm according to the DIN 43880: 1988-12 standard or is intended to be calculated by multiplying this dimension by 0.5 or an integer multiple thereof, that is to say: k×0.5×18 mm or k×0.5×17.5 mm (where k=1, 2, 3, . . . ). For example, according to the prior art, a single-pole miniature circuit breaker has a width of 1 HP. The fittings of electrical installation distribution boards are matched to the horizontal pitch units, for example the width of mounting rails/top-hat rails, in accordance with DIN 43871 "Consumer units for built-in equipment up to 63 A".

Figure 3:
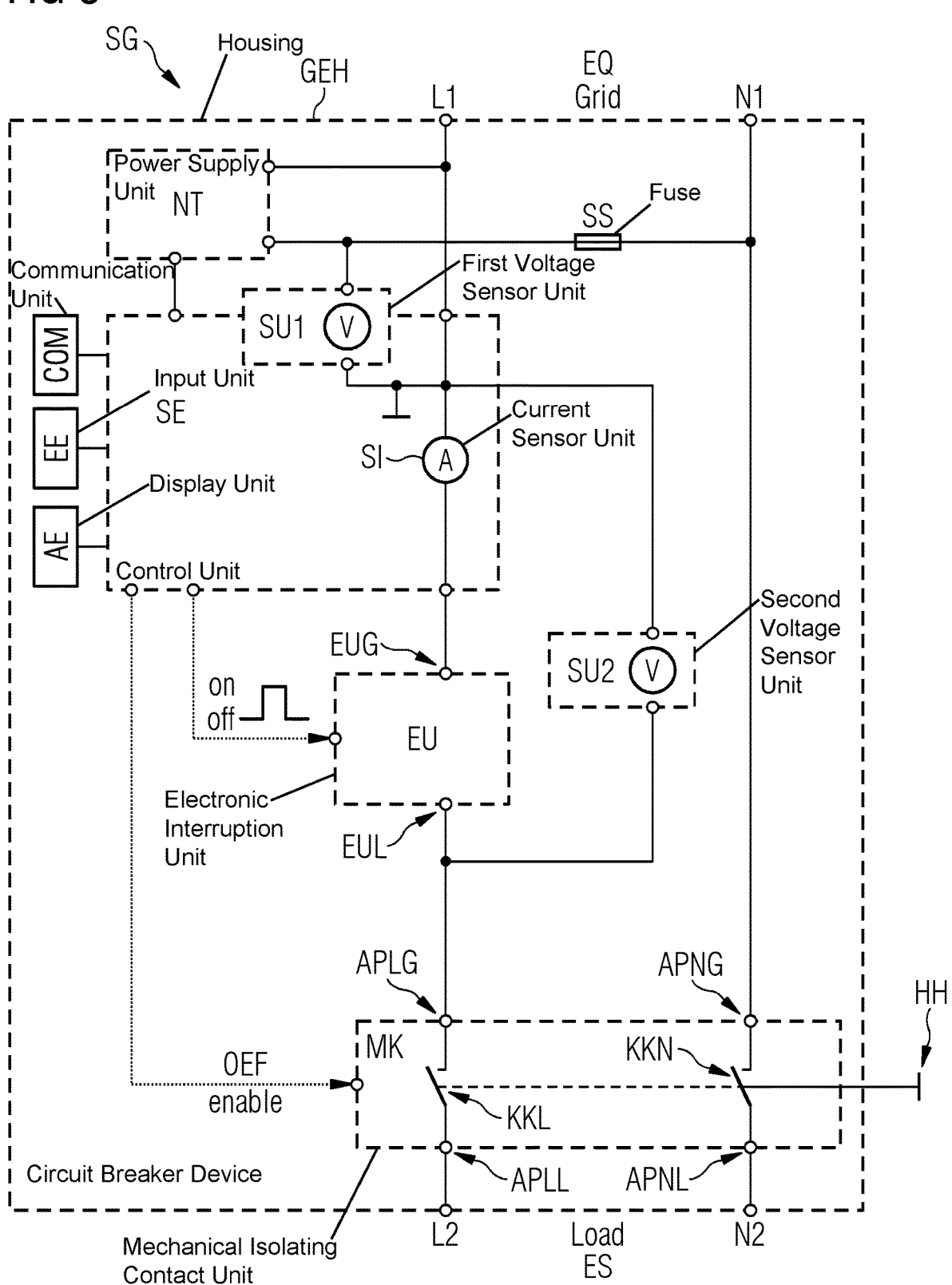
FIG. 3 shows a third illustration of a circuit breaker device.

FIG. 3 shows an illustration of a circuit breaker device SG according to FIGS. 1 and 2, with the following differences:
the grid-side connections L1, N1 or the grid side EQ are also denoted by the reference sign GRID,
the load-side connections L2, N3 or the load side ES are also denoted by the reference sign LOAD,
the (two-pole) mechanical isolating contact unit MK has load-side connection points APLL, APNL and grid-side connection points APLG, APNG,
wherein a load-side connection point APNL is provided for the neutral conductor, a load-side connection point APLL is provided for the phase conductor, a grid-side connection point APNG is provided for the neutral conductor, a grid-side connection point APLG is provided for the phase conductor. The load-side connection points APNL, APLL are connected to the load-side neutral and phase conductor connections N2, L2 such that it is possible to switch between opening contacts KKN, KKL in order to prevent a flow of current and closing the contacts for allowing a flow of current in the low-voltage circuit,
an, in particular single-pole, electronic interruption unit EU (which is arranged in particular in the phase conductor in the case of a single-pole embodiment),
having a grid-side connecting point EUG which is electrically connected to the grid-side phase conductor connection L1, and
a load-side connecting point EUL which is electrically connected to the grid-side connection point APLG of the mechanical isolating contact unit MK, wherein the electronic interruption unit EU, as a result of semiconductor-based switching elements (not illustrated), has or can be switched between a high-impedance state of the switching elements in order to prevent a flow of current and a low-impedance state of the switching elements for allowing the flow of current in the low-voltage circuit,
the control unit SE is connected to the current sensor unit SI, the mechanical isolating contact unit MK and the electronic interruption unit EU.

The mechanical isolating contact unit MK is arranged on the load side, the electronic interruption unit EU is arranged on the grid side.

The grid side GRID with the power source is normally live. An electrical consumer is normally connected on the load side LOAD.

The circuit breaker device SG may be designed such that the level of the voltage across the electronic interruption unit is advantageously able to be ascertained. In other words, the level of a first voltage between grid-side connection point EUG and load-side connection point EUL of the electronic interruption unit EU is able to be ascertained or is ascertained. For this purpose, in the example according to FIG. 3, provision is made for a second voltage sensor unit SU2 which is connected to the control unit SE and which ascertains the level of the voltage between grid-side connection point EUG and load-side connection point EUL of the electronic interruption unit EU. In the voltage measurement performed by the second voltage sensor unit SU2, the voltage across the series connection of electronic interruption unit EU and current sensor SI may alternatively also be ascertained, as illustrated in FIG. 3. The current sensor unit SI has a very low internal resistance, meaning that the ascertaining of the level of the voltage is not impaired, or is impaired to a negligible extent.

The first voltage sensor unit SU1 which ascertains the level of the voltage between the grid-side neutral conductor connection NG and grid-side phase conductor connection LG may advantageously be provided.

In the example according to FIG. 3, the electronic interruption unit EU has a single-pole design, in the example in the phase conductor. In this case, the grid-side connection point APNG for the neutral conductor of the mechanical isolating contact unit MK is connected to the grid-side neutral conductor connection NG of the housing GEH.

The circuit breaker device SG is advantageously designed such that the contacts of the mechanical isolating contact unit MK are able to be opened, but not closed, by the control unit SE, which is indicated by an arrow from the control unit SE to the mechanical isolating contact unit MK.

The circuit breaker device SG has a power supply or power supply unit NT, for example a switched-mode power supply unit. The power supply/power supply unit NT is provided in particular for the control unit SE, which is indicated by a connection between power supply/power supply unit NT and control unit SE in FIG. 3. The power supply/power supply unit NT is connected (on the other side) to the grid-side neutral conductor connection NG and the grid-side phase conductor connection LG. Provision may advantageously be made for a fuse SS, in particular thermal fuse, or a switch SCH (not depicted) in the connection to the grid-side neutral conductor connection NG (or/and phase conductor connection LG). The power supply unit NT is normally constantly supplied with power according to the invention. It is optionally protected by the fuse SS or is able to be deactivated by the switch SCH. Advantageously, the switch SCH/Sch may be designed such that the switch is only able to be opened when the contacts are in the open state. This increases the safety of the device, since the electronics (in particular the control unit) are not able to be de activated when the contacts are closed.

The low-voltage circuit may be a three-phase AC circuit, with one neutral conductor and three phase conductors. The circuit breaker device may for this purpose be designed as a three-phase variant and for example have further grid-side and load-side phase conductor connections. Electronic interruption units according to the invention and contacts of the mechanical isolating contact unit are similarly each provided between the further grid-side and load-side phase conductor connections, as are current sensor units. Provision may also be made to ascertain voltages (for example using first voltage sensor units).

A high-impedance state is understood to mean a state in which only a current of negligible magnitude flows. High-resistance resistance values are in particular understood to mean those greater than 1 kiloohm, better still greater than 10 kiloohms, 100 kiloohms, 1 megaohm, 10 megaohms, 100 megaohms, 1 gigaohm or more.

A low-resistance state is understood to mean a state in which the current value indicated on the circuit breaker device could flow. Low-resistance resistance values are in particular understood to mean those less than 10 ohms, better still less than 1 ohm, 100 milliohms, 10 milliohms, 1 milliohm or less.

The circuit breaker device may have an input unit which may also or additionally be designed as a communication unit COM. The input unit may further have a display function. A separate display unit AE may also be provided.

The communication unit COM may be in particular a wireless communication unit.

According to the invention, the circuit breaker device SG is configured in such a way that, after a flow of current has been prevented (for example in the case of a short circuit or overload or overcurrent, that is to say when the resistance on the load side is for example less than 1 ohm (short circuit) or else when there is a high current or current increase (first derivative of the current with respect to time);

depending on the circuit breaker device type, the current threshold value (a current increase threshold value in the case of a current increase) may for example be an n-times value of the nominal current of the circuit breaker device)

at least one electrical parameter at at least one load-side connection (or in one variant the load-side connections) is checked by way of a high-impedance state of the switching elements of the electronic interruption unit and closed state of the contacts.

This can be carried out by way of the control unit SE, for example by way of the microcontroller, on which for example a computer program product is running, comprising commands that, when the program is executed by the microcontroller, prompt the latter to carry out the checking.

The at least one electrical parameter is in particular a resistance, a capacitance, an inductance, or an impedance.

The at least one electrical parameter is in particular a current or a voltage (in the latter case a voltage sensor unit is provided).

The at least one electrical parameter has a target range, which in particular is dependent on the circuit breaker device. The checking can be carried out until the electrical parameter is within the target range.

The target range may also be characterized by a target value. The checking is carried out until the electrical parameter is greater (or if appropriate less) than a target value.

For example, a temporary short circuit arises, which results in a high short-circuit current and so a current limit value (for example also a current limit value) is exceeded. In order to prevent the short-circuit current, the switching elements of the electronic interruption unit change to the high-impedance state, as a result of which the flow of current is prevented or interrupted. The circuit breaker device now checks (after the flow of current has been prevented) at least one electrical parameter at at least one (or both) load-side connection(s), for example the electrical resistance. When the resistance is greater than a target value or is within the target range again, for example in the case of a 230 volt low-voltage circuit and a nominal current of the circuit breaker device of 10 amperes with respect to a resistance value of 23 ohms as target value, it is thus possible, when the resistance value is greater than 23 ohms (that is to say it within the target range), for the electronic interruption unit to change back to the low-impedance state and thus re-establish the power supply (for example with the aim of maximum supply reliability). If there is still a fault, the circuit breaker device will prevent/interrupt the flow of current again. The target range contains not only the per-manent nominal current but also for example a short-term overcurrent, for example 2 or 3 times the normal current for a time of for example 10 seconds.

The checking can be carried out until the electrical parameter is within the target range SB. (When the electrical parameter is within the target range, the electronic interruption unit changes to the low-impedance state.)

Other electrical parameters can be checked. Only when all of the checked electrical parameters are within the target range SB does the electronic interruption units change to the low-impedance state EUn.

The checking of the at least one electrical parameter may be dependent on the event which prevents the flow of current, that is to say depending on the event that causes the high-impedance state of the electronic interruption unit.

In the case of too high a current (as the event), as in the case of a short circuit, for example an electrical resistance or the electrical impedance (as the electrical parameter). In the case of an overvoltage (as event), the further presence of an overvoltage (as the electrical parameter). Specifically in the case of too high an integration value of the current over time (integral I dt), as in the case of an overload, current or electrical resistance or the electrical impedance (as the electrical parameter).

In the case of too high a current, the at least one electrical parameter, in the example the electrical resistance or imped-ance, can be checked by way of a measurement at an instantaneous value of the (grid) voltage of less than 50 volts, for example by temporarily connecting the electronic interruption unit at corresponding instantaneous values of the (grid) voltage.

In the case of an overvoltage (as the event), further presence of the overvoltage can be checked through purely ascertaining the level of the voltage, in particular without switching operations (in a manner free of switching opera-tions) of the electronic interruption unit, specifically when the electronic interruption unit continues to be in the high-impedance state.

In the case of too high an integration value of the current overtime (integral I dt), as in the case of an overload, the at least one electrical parameter, in particular the current or the electrical resistance or impedance, can be checked by way of a measurement, for example by way of connecting the electronic interruption unit (low-impedance state), for example by connecting for a plurality of half-waves or full-waves (for example 1, 2, 3, 4 or 5 half-waves or full-waves or longer) of the electrical voltage.

This means that the type of check of the at least one electrical parameter is dependent on the event which causes the high-impedance state of the electronic interruption unit. The time period, the time range, the time limit and the time interval may also be determined or may be able to be set depending on the event which causes the high-impedance state of the electronic interruption unit (subsequently over time).

When the electrical parameter is within the target range, the electronic interruption unit can advantageously change to the low-impedance state EUn only when the electrical parameter is within the target range SB for a first time range ZB1. For example, the first time range may have a value from the range of 10 ms to 10 s, more specifically 10 ms to 100 ms or 100 ms to 200 ms or 200 ms to 1 s or 1 s to 10 s, depending on application. A range from 1 ms is also possible.

As an alternative, the circuit breaker device SG may have an input unit. The input unit may have input elements on the housing of the circuit breaker device. The input unit may also or additionally have a wired (for example electrically, optically) or wireless (for example radio, optical) input option, for example by way of a communication unit. The input unit may also have a display function.

When the electrical parameter is within the target range, the electronic interruption unit changes to the low-imped-ance state only when there is confirmation Q1 (by way of an operator, user) by means of the input unit, that is to say the power supply is to be switched on again after the high-impedance state.

The at least one electrical parameter can be checked within a first time period ZS1 after the current limit value or current/time limit value has been exceeded. The first time period may be in particular less than 200 ms, 100 ms, 50 ms, 30 ms, 20 ms or 10 ms. After the first time period ZS1 has passed, the contacts of the mechanical isolating contact unit MKo can be opened when at least one electrical parameter is outside of the target range SB thereof. This provides a response according to a standard in which for example an interruption must take place only after for example 200 ms. Before this, according to the invention, there may be a further check for the presence of the tripping condition, without going against the standard. It is thus possible to achieve a higher degree of supply reliability, in particular in the case of non-critical faults.

According to the invention, at least one electrical param-eter at at least one load-side connection can be checked by way of at least one switching element, in particular two or all switching elements, of the electronic interruption unit (temporarily) coming to have a low impedance. More spe-cifically, at least one electrical parameter at at least one load-side connection can be checked by way of the switch-ing elements of the electronic interruption unit coming to have a low impedance at an absolute-value instantaneous value of the voltage that is lower than a first voltage threshold value (with respect to an AC voltage), for example 120 V, in particular less than 50 V (RMS value AC voltage). The electronic interruption unit can be switched on tempo-rarily, that is to say the semiconductor-based switching element is temporarily switched to have a low impedance. Temporarily in this case means for example a first switched-on period in which the instantaneous voltage value u(t) of the AC voltage does not exceed a particular value, for example 50 volts (limit (protective) extra-low voltage—with a peak value of 70 volts).

When an AC voltage with discontinuities ("discontinuous AC voltage") is generated, the instantaneous value may therefore be greater than 50 V. According to the invention, the RMS value of the AC voltage should then be less than the first voltage threshold value, for example 50 volts (or not greater than 50 V).

For example, the AC voltage can be connected at the zero crossing of the AC voltage (0°) for approximately 444 μs/up to 8° (electronic interruption unit EU low-impedance), that is to say until the instantaneous voltage value of maximum 50 volts is reached.

As an alternative, switch-on can also take place at approximately −8° (in relation to the zero crossing of the AC voltage), the zero crossing can be passed through and switch-off can take place again at +8°, that is to say for approximately 888 μs. This means that the first switched-on period is less than 1 ms, in particular less than 0.9 ms, more specifically approximately 0.8 ms (or in each case half, in each case depending on the switch-on time). It is thus possible to reliably check the at least one electrical parameter, in particular with respect to the resistance, a capacitance, inductance or impedance at the load-side connections (short circuit, overload, . . . —or the characteristic values of resistance, capacitance, inductance or impedance thereof). For a greater degree of reliability, the switching elements can come to have a high impedance again at an absolute-value instantaneous value of the voltage that is greater than the first voltage threshold value. According to the invention, there is therefore no dangerous voltage present at the load-side connections.

As an alternative, at least one electrical parameter at the load-side connections can be checked by applying an auxiliary voltage, in particular a DC voltage, that is lower than the first voltage limit. The level of the first voltage limit may be a (limit) value in the range of the (protective) extra-low voltage or may correspond to the voltage threshold value. According to the invention, there is no dangerous voltage present at the load-side connections either. Protective low-voltage is used to refer to the low-voltage range, which is lower than 50 volts during operation with alternating current or lower than 120 volts during operation with direct current (DC). At present there are discussions of lowering the limit for protective extra-low voltage in direct-current (DC) operation to 90 volts. Limits of 25 V AC or 60 V DC are also possible.

As an alternative, at least one electrical parameter at at least one load-side connection can be checked by way of at least one switching element, in particular two or all switching elements, of the electronic interruption unit temporarily coming to have a low impedance. More specifically, at least one electrical parameter at at least one load-side connection can be checked by way of the switching elements of the electronic interruption unit coming to have a low impedance for a first switched-on period ED1, such that the RMS value voltage (which is ascertained over a grid period) which is present at the load connections does not exceed 50 V. That is to say that the instantaneous value of the voltage may temporarily be greater than 50 V but the RMS value of the voltage which is ascertained over a grid period is less than 50 V. The first switched-on period is therefore always less than 20 ms, more specifically less than 10 ms, in particular less than 1 ms.

The checking may be carried out at a (configurable) first time interval ZA1. The first time interval ZA1 may be in particular 10 s, 30 s, 1, 5, 10 or 15 minutes. Any intermediate value is possible and disclosed. More specifically, after the first time period ZS1 has passed. The mechanical isolating contact unit MK can change to an open state of the isolating contacts after a first time limit ZG1 has passed. The first time limit may be for example a value such as: 15 min, 30 min, 1 h, 8 h, 24 h, 36 h or 48 h; intermediate values are also possible.

At least one, some or all of the following may be able to be set or configured by means of the input unit/communication unit:

target range of the at least one electrical parameter or
        target value,
    first time range, first time period,
first voltage threshold value,
first voltage limit,
first time interval,
first time limit,
the confirmation.

The target range of the electrical parameter corresponds to the permissible electrical operating range of the circuit breaker device with respect to said parameter.

By way of example, the checking at the load-side connections may comprise checking at least one, in particular a plurality of or all, of the following parameters:

testing for the exceedance of a first overvoltage value or/and higher second overvoltage value or/and higher third overvoltage value,
    testing for parameters of the load-sized connection, in particular for undershooting of a load-side first or/and second resistance value or load-side first or/and second impedance value.

The testing for overvoltage values can be carried out by way of specific measurements by way of the first voltage sensor unit which is then provided. The limit values can be stipulated as already illustrated.

The testing of parameters of the load-side connection, in particular for undershooting of a load-side first or/and second resistance value or load-side first or/and second impedance value, can be carried out for example by way of described temporary switching-on (specifically: described switched-on period; see above) of the electronic interruption unit and measurements by way of the voltage and current sensor unit. The ascertained values are compared with determined first or second resistance or impedance values (target range, target value).

Depending on the implementation of the parameter to be checked, that is to say the preceding implementation, it is possible: to output a piece of overvoltage information when the first overvoltage value is exceeded (voltage too high), for the electronic interruption unit to come to have a high impedance when the second overvoltage value is exceeded (voltage level critical),
    to open (disconnect) the contacts by way of the mechanical isolating contact unit when the third overvoltage value is exceeded (voltage level dangerous (for further operation of the device)),
    to output a piece of impedance information (low-impedance consumer—overload?) when the load-side first resistance value or load-side first impedance value is undershot, or
    for the electronic interruption unit to continue to have a high impedance when the load-side second resistance value or load-side second impedance value is undershot (short circuit on load side).

Defined measures—warning—continuing to have a high impedance—DC isolation—can be carried out in stages, coupled or carried out by means of the checking, depending on the exceedance or undershooting of particular defined parameters, which increases the operational safety or supply reliability in the low-voltage circuit. The checking is advantageously carried out continuously when the contacts are closed/connected. If the parameters are within the intended range, that is to say there are no exceedances or undershoots, switch-on can take place (low-impedance switching elements).

FIGS. 4 to 9 illustrate by way of example some of the time sequences mentioned above. FIGS. 4 to 9 each show a timeline t, on which particular, previously mentioned, times are plotted, as well as states of the mechanical isolating contact unit MK and the electronic interruption unit EU.

Figure 4:
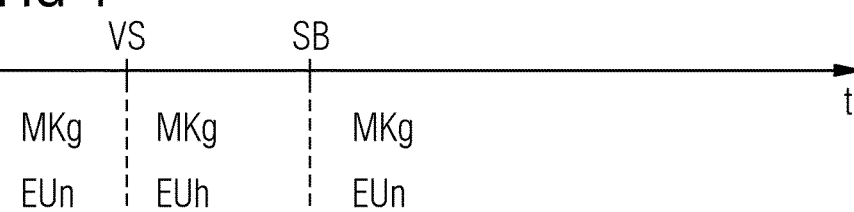
FIGS. 4 to 9 show time sequences for explaining the invention.

FIG. 4 shows the time at which a flow of current is prevented VS, which is brought about for example by current limit values or current/time limit values being exceeded. Before the time at which a flow of current is prevented VS, the mechanical isolating contact unit MK is in a closed state MKg of the contacts and the electronic interruption unit EU is in a low-impedance state EUn of the switching elements for allowing a flow of current in the low-voltage circuit. After the flow of current has been prevented VS, the mechanical isolating contact unit MK continues to be in a closed state MKg of the contacts (or a potentially occurring flow of current/in order to quickly enable a flow of current again) and the electronic interruption unit EU continues to be in a high-impedance state EUh of the switching elements in order to prevent the flow of current. After the flow of current has been prevented VS, at least one electrical parameter at at least one load-side connection is checked. The at least one electrical parameter has a target range which in particular is dependent on the circuit breaker device. The checking is carried out according to FIG. 4 until the electrical parameter is within the target range SB. When the electrical parameter is within the target range SB, the electronic interruption unit EU changes to the low-impedance state EUn for allowing a flow of current in the low-voltage circuit. That is to say that, after the electrical parameter is within the target range SB, the mechanical isolating contact unit MK is in a closed state MKg of the contacts and the electrical interruption unit EU is in a low-impedance state EUn of the switching elements for allowing a flow of current in the low-voltage circuit, as is indicated in FIG. 4.

Figure 5:
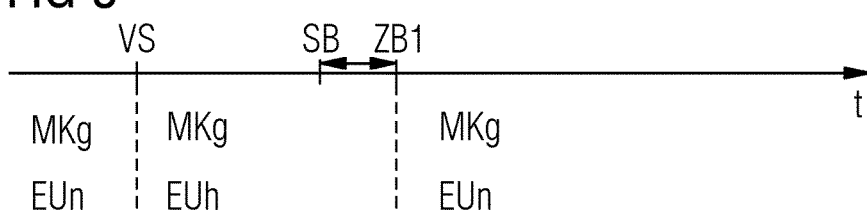

FIG. 5 shows an illustration according to FIG. 4, with the difference that, when the electrical parameter is back within the target range SB, the electronic interruption unit EU changes to the low-impedance state EUn only when the electrical parameter is within the target range SB for a first time range ZB1. That is to say that, after the first time range ZB1, the electronic interruption unit EU changes to a low-impedance state EUn of the switching elements for allowing a flow of current in the low-voltage circuit (wherein the mechanical isolating contact unit MK remains in a closed state MKg of the contacts), as is indicated in FIG. 5.

Figure 6:
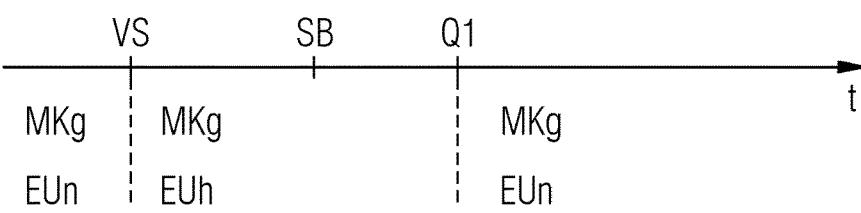

FIG. 6 shows an illustration according to FIG. 4, with the difference that, when the electrical parameter is within the target range SB, the electronic interruption unit changes to the location impedance state EUn only when there is confirmation Q1 by means of the input unit EE. That is to say that, after the confirmation Q1, the electronic interaction unit EU changes to the low-impedance state EUn of the switching elements for allowing a flow of current in the low-voltage circuit (wherein the mechanical isolating contact unit MK remains in a closed state MKg contacts), as is indicated in FIG. 6.

Figure 7:
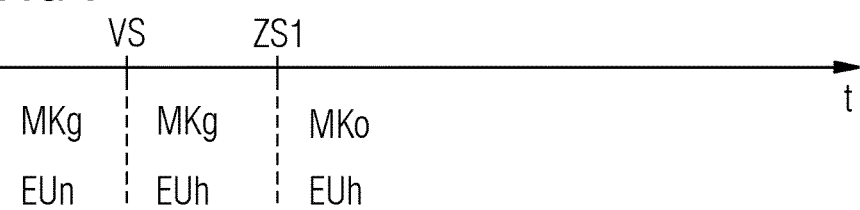

FIG. 7 shows an illustration according to FIG. 4, with the difference that at least one electrical parameter is checked after current has been prevented VS (for example after the current limit value or current time limit value has been exceeded) within a first time period ZS1.

After the first time period ZS1 has passed, the contacts of the mechanical isolating contact unit can be opened MKo when at least one electrical parameter is outside of the target range SB thereof (target range not reached within the first time period ZS1), as indicated in FIG. 7. The electronic interruption unit remains in the high-impedance state EUh (since the prevention of flow of current VS).

Figure 8:
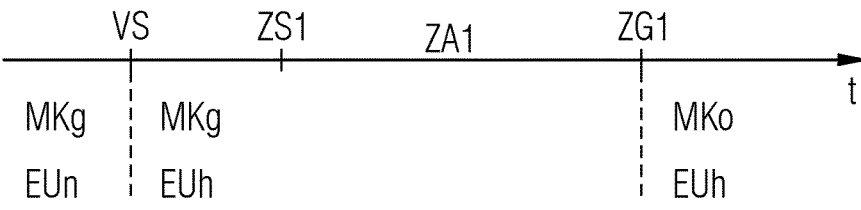

FIG. 8 shows an illustration according to FIG. 7, with the difference that, after the first time period ZS1 has passed, the at least one electrical parameter is checked at a first time interval ZA1 until a first time limit ZG1 is reached. After the first time limit ZG1 has passed, the mechanical isolating contact unit MK changes to an open state MKo provided the at least one electrical parameter (before then) is not within the target range SB, as indicated in FIG. 8. The electronic interruption unit remains in the high-impedance state EUh (since the prevention of flow of current VS).

Figure 9:
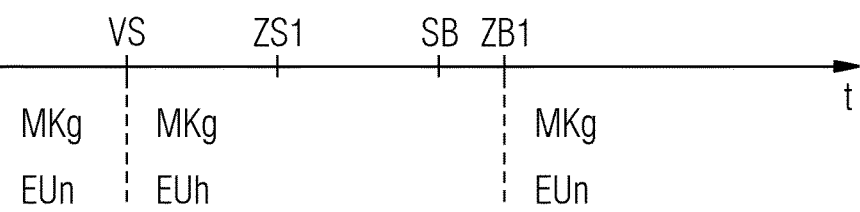

FIG. 9 shows an illustration according to FIG. 8, with the difference that, after the first time period ZS1 has passed, the at least one electrical parameter reaches the target range SB thereof. However, the electronic interruption unit EU changes to the low-impedance state EUn only when the electrical parameter is within the target range SB for a first time range ZB1 (analogous to FIG. 5). That is to say that, after the first time range ZB1, the electronic interruption unit EU changes to a low-impedance state EUn of the switching elements for allowing a flow of current in the low-voltage circuit (wherein the mechanical isolating contact unit MK remains in a closed state MKg of the contacts), as is indicated in FIG. 9.

Other modes of behavior or modes of operation can be combined in an analogous manner for a person skilled in the art.

Although the invention has been described and illustrated more specifically in detail by means of the exemplary embodiment, the invention is not restricted by the disclosed examples and other variations may be derived therefrom by a person skilled in the art without departing from the scope of protection of the invention.

The invention claimed is:

1. A circuit breaker device for protecting an electrical low-voltage circuit, the circuit breaker device comprising:
    a housing having grid-side and load-side connections for conductors of the low-voltage circuit;
    a current sensor unit for ascertaining a current level of the low-voltage circuit;
    a mechanical isolating contact unit having contacts with a closed state for allowing a current flow in the low-voltage circuit or an open state for a DC isolation in the low-voltage circuit preventing a current flow;
    an electronic interruption unit connected in series with said mechanical isolating contact unit on a circuit side, said electronic interruption unit including semiconductor-based switching elements having a high-impedance state of said semiconductor-based switching elements for preventing a current flow and a low-impedance state of said semiconductor-based switching elements for allowing the current flow in the low-voltage circuit;
    a control unit connected to said current sensor unit, to said mechanical isolating contact unit and to said electronic interruption unit, for initiating prevention of a flow of current in the low-voltage circuit upon exceeding current limit values or current/time limit values; and
    at least one electrical parameter at least at one of said load-side connections being checked after prevention of a flow of current by way of a high-impedance state of said semiconductor-based switching elements of said electronic interruption unit and a closed state of said contacts;
    said at least one electrical parameter being checked within a first time period after exceeding the current limit value or current/time limit value, and said first time period being less than 200 ms.

2. The circuit breaker device according to claim 1, wherein:

said at least one electrical parameter has a target range dependent on the circuit breaker device;

the checking is carried out until said at least one electrical parameter is within said target range; and said electronic interruption unit changes to the low-impedance state when said at least one electrical parameter is within said target range.

3. The circuit breaker device according to claim 2, wherein said target range has a target value, and the checking is carried out until said at least one electrical parameter is greater than a minimum target value.

4. The circuit breaker device according to claim 2, wherein when said at least one electrical parameter is within said target range, said electronic interruption unit changes to the low-impedance state only when said at least one electrical parameter is within said target range for a first time range.

5. The circuit breaker device according to claim 2, which further comprises:

an input unit;

said electronic interruption unit changing to the low-impedance state when said at least one electrical parameter is within said target range, only upon confirmation by said input unit.

6. The circuit breaker device according to claim 1, wherein, after the first time period has passed, said contacts of said mechanical isolating contact unit are opened when said at least one electrical parameter is outside of said target range thereof.

7. The circuit breaker device according to claim 1, wherein said at least one electrical parameter is a current, a voltage, a resistance, a capacitance, an inductance, or an impedance.

8. The circuit breaker device according to claim 1, wherein said mechanical isolating contact unit is associated with said load-side connections.

9. The circuit breaker device according to claim 1, wherein the check of said at least one electrical parameter is of a type being dependent on an event causing the high-impedance state of said electronic interruption unit.

10. A non-transitory computer program product comprising commands that, upon executing the program on a microcontroller, prompt the microcontroller, after preventing a flow of current by way of a high-impedance state of said semiconductor-based switching elements of said electronic interruption unit and a closed state of said contacts, to check said at least one electrical parameter at least at one of said load-side connections of the circuit breaker device according to claim 1.

11. A non-transitory computer-readable storage medium on which the non-transitory computer program product according to claim 10 is stored.

12. A circuit breaker device for protecting an electrical low-voltage circuit, the circuit breaker device comprising:

a housing having grid-side and load-side connections for conductors of the low-voltage circuit;

a current sensor unit for ascertaining a current level of the low-voltage circuit;

a mechanical isolating contact unit having contacts with a closed state for allowing a current flow in the low-voltage circuit or an open state for a DC isolation in the low-voltage circuit preventing a current flow;

an electronic interruption unit connected in series with said mechanical isolating contact unit on a circuit side, said electronic interruption unit including semiconductor-based switching elements having a high-impedance state of said semiconductor-based switching elements for preventing a current flow and a low-impedance state of said semiconductor-based switching elements for allowing the current flow in the low-voltage circuit;

a control unit connected to said current sensor unit, to said mechanical isolating contact unit and to said electronic interruption unit, for initiating prevention of a flow of current in the low-voltage circuit upon exceeding current limit values or current/time limit values;

at least one electrical parameter at least at one of said load-side connections being checked after prevention of a flow of current by way of a high-impedance state of said semiconductor-based switching elements of said electronic interruption unit and a closed state of said contacts;

said at least one electrical parameter at least at one of said load-side connections being checked by one, two or all of said semiconductor-based switching elements of said electronic interruption unit assuming a low impedance for a first switched-on period; and said at least one electrical parameter at least at one of said load-side connections is being checked by said semiconductor-based switching elements of said electronic interruption unit assuming a low impedance at an absolute-value instantaneous value of a voltage being lower than a first voltage threshold value.

13. A circuit breaker device for protecting an electrical low-voltage circuit, the circuit breaker device comprising:

a housing having grid-side and load-side connections for conductors of the low-voltage circuit;

a current sensor unit for ascertaining a current level of the low-voltage circuit;

a mechanical isolating contact unit having contacts with a closed state for allowing a current flow in the low-voltage circuit or an open state for a DC isolation in the low-voltage circuit preventing a current flow;

an electronic interruption unit connected in series with said mechanical isolating contact unit on a circuit side, said electronic interruption unit including semiconductor-based switching elements having a high-impedance state of said semiconductor-based switching elements for preventing a current flow and a low-impedance state of said semiconductor-based switching elements for allowing the current flow in the low-voltage circuit;

a control unit connected to said current sensor unit, to said mechanical isolating contact unit and to said electronic interruption unit, for initiating prevention of a flow of current in the low-voltage circuit upon exceeding current limit values or current/time limit values;

at least one electrical parameter at least at one of said load-side connections being checked after prevention of a flow of current by way of a high-impedance state of said semiconductor-based switching elements of said electronic interruption unit and a closed state of said contacts;

said at least one electrical parameter at least at one of said load-side connections being checked by one, two or all of said semiconductor-based switching elements of said electronic interruption unit assuming a low impedance for a first switched-on period; and said semiconductor-based switching elements assuming a high impedance again at an absolute-value instantaneous value of the voltage being greater than the first voltage threshold value.

14. A circuit breaker device for protecting an electrical low-voltage circuit, the circuit breaker device comprising:
a housing having grid-side and load-side connections for conductors of the low-voltage circuit;
a current sensor unit for ascertaining a current level of the low-voltage circuit;
a mechanical isolating contact unit having contacts with a closed state for allowing a current flow in the low-voltage circuit or an open state for a DC isolation in the low-voltage circuit preventing a current flow;
an electronic interruption unit connected in series with said mechanical isolating contact unit on a circuit side, said electronic interruption unit including semiconductor-based switching elements having a high-impedance state of said semiconductor-based switching elements for preventing a current flow and a low-impedance state of said semiconductor-based switching elements for allowing the current flow in the low-voltage circuit;
a control unit connected to said current sensor unit, to said mechanical isolating contact unit and to said electronic interruption unit, for initiating prevention of a flow of current in the low-voltage circuit upon exceeding current limit values or current/time limit values; and
at least one electrical parameter at least at one of said load-side connections being checked after prevention of a flow of current by way of a high-impedance state of said semiconductor-based switching elements of said electronic interruption unit and a closed state of said contacts;
said at least one electrical parameter at said load-side connections is being checked by applying an auxiliary or DC voltage being lower than a first voltage limit.

15. A circuit breaker device for protecting an electrical low-voltage circuit, the circuit breaker device comprising:
a housing having grid-side and load-side connections for conductors of the low-voltage circuit;
a current sensor unit for ascertaining a current level of the low-voltage circuit;
a mechanical isolating contact unit having contacts with a closed state for allowing a current flow in the low-voltage circuit or an open state for a DC isolation in the low-voltage circuit preventing a current flow;
an electronic interruption unit connected in series with said mechanical isolating contact unit on a circuit side, said electronic interruption unit including semiconductor-based switching elements having a high-impedance state of said semiconductor-based switching elements for preventing a current flow and a low-impedance state of said semiconductor-based switching elements for allowing the current flow in the low-voltage circuit;
a control unit connected to said current sensor unit, to said mechanical isolating contact unit and to said electronic interruption unit, for initiating prevention of a flow of current in the low-voltage circuit upon exceeding current limit values or current/time limit values; and
at least one electrical parameter at least at one of said load-side connections being checked after prevention of a flow of current by way of a high-impedance state of said semiconductor-based switching elements of said electronic interruption unit and a closed state of said contacts;
after a first time period has passed, the checking is being carried out at a first time interval of between 1 second and 15 minutes.

16. A circuit breaker device for protecting an electrical low-voltage circuit, the circuit breaker device comprising:
a housing having grid-side and load-side connections for conductors of the low-voltage circuit;
a current sensor unit for ascertaining a current level of the low-voltage circuit;
a mechanical isolating contact unit having contacts with a closed state for allowing a current flow in the low-voltage circuit or an open state for a DC isolation in the low-voltage circuit preventing a current flow;
an electronic interruption unit connected in series with said mechanical isolating contact unit on a circuit side, said electronic interruption unit including semiconductor-based switching elements having a high-impedance state of said semiconductor-based switching elements for preventing a current flow and a low-impedance state of said semiconductor-based switching elements for allowing the current flow in the low-voltage circuit;
a control unit connected to said current sensor unit, to said mechanical isolating contact unit and to said electronic interruption unit, for initiating prevention of a flow of current in the low-voltage circuit upon exceeding current limit values or current/time limit values; and
at least one electrical parameter at least at one of said load-side connections being checked after prevention of a flow of current by way of a high-impedance state of said semiconductor-based switching elements of said electronic interruption unit and a closed state of said contacts;
said mechanical isolating contact unit changing to an open state of said contacts after a first time limit has passed, and the first time limit being between 15 minutes and 48 hours.

* * * * *